May 9, 1944.  H. K. GROWALD  2,348,470
DETACHABLE GUN MOUNT
Filed Aug. 23, 1940  2 Sheets-Sheet 1

HENRY K. GROWALD.
INVENTOR.

BY *James M. Clark*
ATTORNEY.

May 9, 1944.  H. K. GROWALD  2,348,470
DETACHABLE GUN MOUNT
Filed Aug. 23, 1940  2 Sheets-Sheet 2
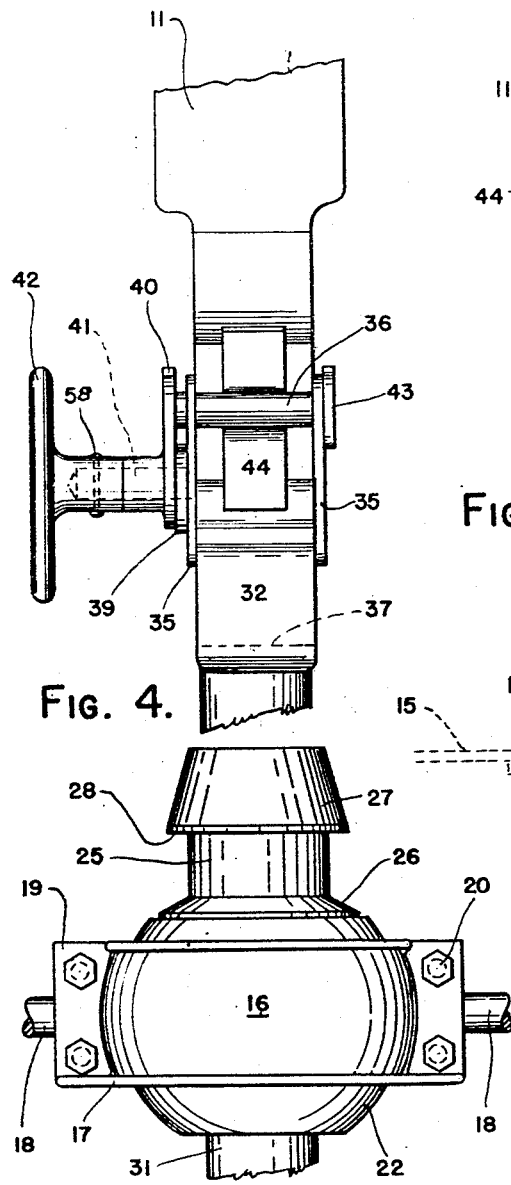
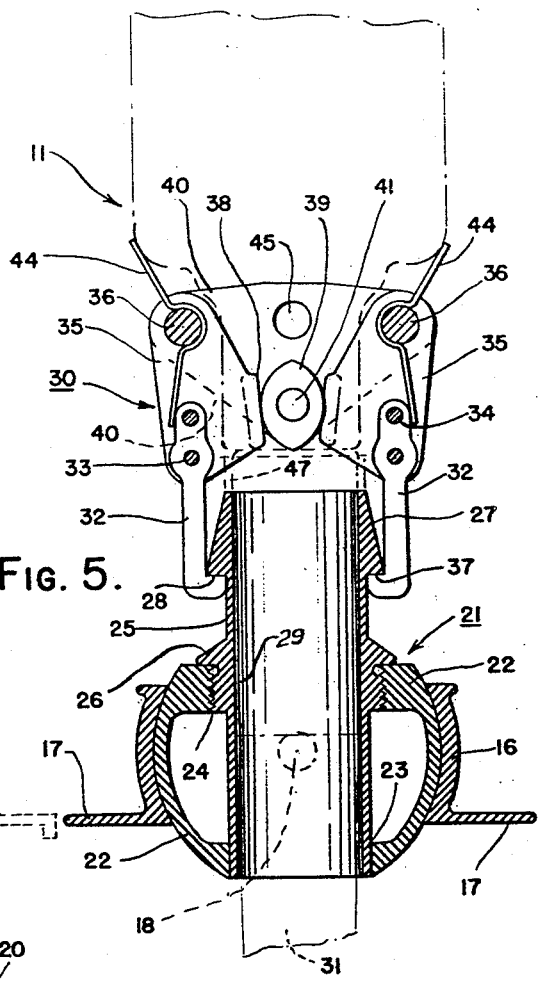
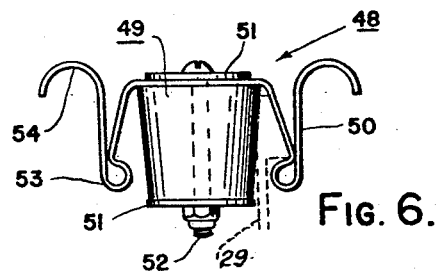
HENRY K. GROWALD.
INVENTOR.
ATTORNEY.

Patented May 9, 1944

2,348,470

UNITED STATES PATENT OFFICE 2,348,470

DETACHABLE GUN MOUNT

Henry K. Growald, San Diego, Calif., assignor to Consolidated Vultee Aircraft Corporation, a corporation of Delaware Application August 23, 1940, Serial No. 353,795

13 Claims. (Cl. 89—37)

The present invention relates to armament for aircraft, tanks and other vehicles, and more particularly to ball and socket gun mounts for readily detachable guns.

Machine guns are ordinarily either of the "fixed" type in which they are aimed with the vehicle, or they are "flexibly" mounted in order that the gun may be aimed in any one of numerous directions regardless of the position of the vehicle with respect to the target. The present invention is particularly adapted for use with guns of the flexibly mounted type.

Heretofore it has been the general practice in military aircraft and tanks carrying a plurality of flexibly mounted machine guns, to provide a machine gun for each mount. In large aircraft which are so equipped there are usually more guns than gunners to operate them and during combat certain of the guns remain idle. This also entails considerable additional weight due to the number of extra guns carried by the airplane, and the gun barrels projecting beyond the exterior surfaces produce additional drag and resistance which retards the speed of the aircraft. It has previously been suggested that aircraft be provided with a plurality of mounts of a type into which a gun, carried from one station to another, could be readily inserted and locked, and from which it might be fired more effectively. This invention relates particularly to an improvement in readily detachable gun mounts of the latter type.

The present improvement consists essentially in rapidly mounting a gun barrel within a ball and socket of relatively small diameter, and in which the socket is pivoted on trunnions to increase the firing angles of the gun beyond the normal limits of the usual ball and socket joint. The present invention further embraces an effective sleeve and snap-jaw latching arrangement whereby the gun is either withdrawn or rammed into position very expeditiously, without delay or the need for any tools.

It is accordingly an object of the present invention to provide a ball and socket gun mount into which a gun may be rapidly inserted and automatically locked for universal mounting. It is a further object to provide such a gun mount from which the gun can be readily detached, and when not in use maintains the continuity of the aerodynamic surfaces through which the gun is fired and offers relatively little drag or resistance to the airplane in flight.

It is a further object of the present invention to provide a universal ball and socket gun mount in which the socket portion is pivotally carried by its supporting frame in such a manner that greatly increased firing angles of the gun are obtained. Another object contemplates a novel relationship of such a pivotal support with respect to the axis of the aircraft body in which the mount is carried. A further object is to provide in such a mount a unitary ball portion having a quick attachment fitting for automatically latching the gun to the mount.

Other objects and advantages of the present invention will become apparent to one versed in this art after a reading of the present specification and the accompanying drawings forming a part hereof.

In the drawings:

Fig. 4 is a fragmentary view of enlarged scale showing the locking portion of the gun in close proximity to the ball and socket portion of the mount;

Fig. 5 is an enlarged cross-section of the ball and socket mount showing the adjacent portions of the gun in latched relationship thereto; and Fig. 6 shows a plug for sealing the opening in the mount after the gun mount has been removed.

Figure 1:
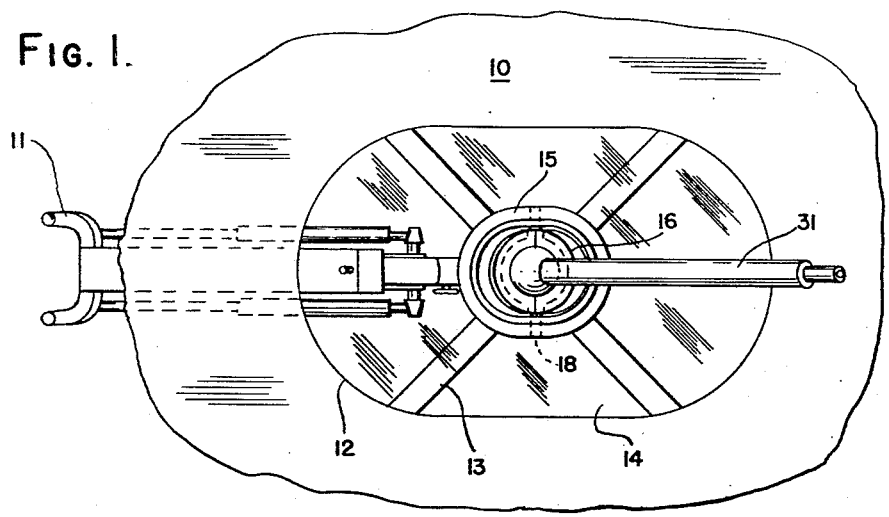
Fig. 1 shows a plan view of a portion of an exterior surface of an aircraft provided with a preferred form of the gun mount of the present invention.
Figure 2:
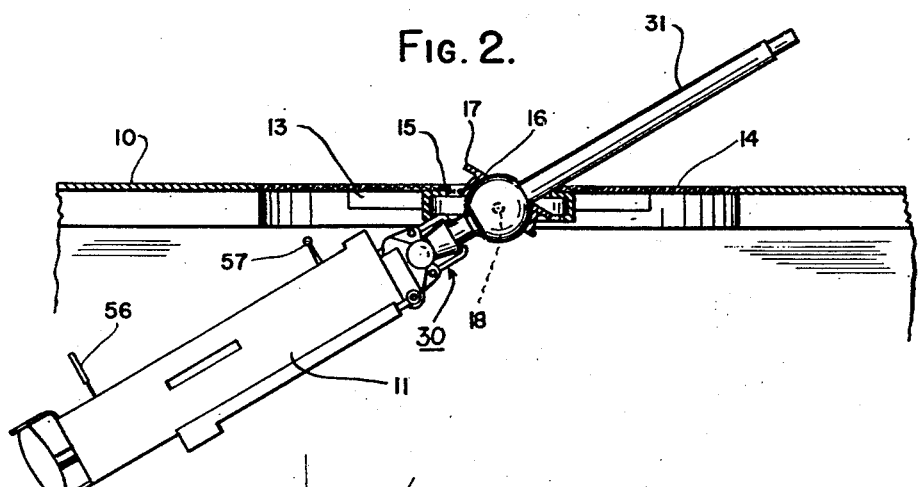
Fig. 2 is a cross-sectional elevation of the gun and mount shown in Fig. 1.

Referring now to Figs. 1 and 2, the numeral 10 designates an exterior wall or skin of any moving craft or vehicle such as an aircraft fuselage or similar portion provided with a preferred embodiment of my improved gun mount adapted to receive the machine gun 11. The exterior wall and skin 10 of the airplane is provided with a suitable opening 12 which is substantially elliptical in outline and preferably extends in the direction of the major axis of the airplane body in which it is provided. Within the opening 12 there is inserted and suitably attached to the aircraft wall structure a frame or spider 13 to which is fitted a transparent cover 14 suitably curved to provide a surface which is flush and continuous with the adjoining skin surface. The frame 13 is provided with a fixed inner frame or marginal portion 15 which is supported from the outer frame by the radially extending ribs 13.

This inner frame 15 is also elliptical in shape and in turn is provided with an elliptical opening within which a socket assembly 16, having a flush and elliptical flange 17, is pivotally carried upon the frame 15 by the socket trunnions 18 journalled therein. The bores within the marginal frame 15 are oppositely and axially alined such that they form journals for the similarly axially alined trunnion pins 18. The axes of the dual trunnion mounting preferably passes through the center of the sphere defined by the part-spherical socket assembly 16.

The socket assembly 16 comprises two like halves which are diametrically split as shown in Fig. 4, and provided with radially disposed attachment flanges 19 suitably apertured for the fastening bolts and nuts 20. The socket assembly is provided with a central part-spherical opening which is finished with a suitable close tolerance to permit the socket halves to be clamped about the hollow ball element 22 and to permit the latter to be universally rotated therein without undue friction or play. The ball element which is similarly provided with a part-spherical exterior surface, as more clearly shown in Fig. 5, has thickened internally extending end portions, one of which is provided with a central cylindrical bore 23 closely fitting the exterior of the cylindrical sleeve element 25. The other thickened end portion is provided with interior threads 24 which is adapted to be engaged by like threads provided externally on the sleeve 25 adjacent its shouldered portion 26. The cylindrical sleeve 25 is provided with a central cylindrical bore 29 of a diameter to closely fit the barrel portion 31 of the gun, and is further provided at its outer terminal with a frusto-conical surface 27 having its taper reducing away from and radially with respect to the center of the ball 22. The surface 27 forms a shouldered or detent portion at 28, and being unitary with the ball 22 forms the male portion of the attachment assembly.

The female latching portion 30 is also shown in Figs. 4 and 5 and is such that it can be readily fitted to a stock machine gun. It comprises essentially the releasing latch elements 32 suitably fixed by the pins 33 and 34 to the dog elements 35 which are pivoted about the transverse pins 36. The latch elements 32 are provided with offset or lipped extremities 37 which are adapted to engage or latch themselves about the shoulder 28 of the sleeve 25, due to the tendency of the flat plate springs 44 to rotate the dogs 35 and the attached latch elements 32 inwardly together toward the gun barrel 31.

The latch-carrying or dog members 35 are provided with cam faces 38 which normally bear against the faces of the central cam element 39 due to the pressure of the springs 44. The pivot pins 36 are attached at their extremities to a bearing face plate 40, having an apertured hub portion, at one side of the gun, and are similarly fixed at the opposite side to a tie plate 43. The latch assembly 30 is supported from the gun by the short pins 45 which are oppositely carried by the side plates 40 and 43 and engage corresponding axially alined bores on each side of the gun barrel. Pivot pins 36 extend between and connect the side plates 40 and 43 on each side of the gun 11 providing pivotal support for the individual halves of the latch mechanisms 30. Both of the pins 36 extend alongside of—and clear of—the gun 11 and serve also as the intermediate pivotal supports for the springs 44, the upper portions of which bear against the gun 11. This portion of the gun tends to spread these upper portions of the springs outwardly while the lower portions in turn tend to rotate the dogs or latch-carrying members 35 inwardly toward each other for latching engagement, and into contact with the central cam member 39. This arrangement permits the free turning of the dogs 35 about their respective pins 36, while at the same time preventing rotation of the assembly with respect to the gun. The camming element 39 is suitably attached to rotate with the stub or cam shaft 41 which is journalled within the hub portion of the yoke 40. The barrel 31 of the gun has fixed thereto a collar 47 which is so disposed on the gun barrel as to limit the position of the gun as it is thrust into the sleeve 25 and wherein the conic surface 27 and shoulder 28 are engaged and latched by the spring-pressed latches 32. Since the surface 27 is formed on the sleeve 25 latching takes place in this position regardless of the angular position of the gun about the axis of its bore or barrel 31.

Due to the pressure of the plate springs 44 to continually urge the dogs 35 and the attached latch elements 32 toward each other, the bearing faces 38 of the dogs maintain cam 39 in the position shown in Fig. 5, namely with its major axis extending in the direction of the bore of the gun. Accordingly, all that is necessary to fix the gun within its mount is to insert the gun barrel within the sleeve 25, and push the gun therein until the offset ends of the latches 32 ride along and are spread by the conical surfaces 27 of the sleeve against the pressure of the spring 44. When the gun has reached the extreme position, as will be determined by the collar 47 on the gun barrel bearing against the outer end of the sleeve 25, the jaws or latches 32 are automatically snapped together and serve to prevent axial movement of the gun with respect to the sleeve. The parts may be fitted, however, such that the gun barrel may be rotated within the sleeve with a minimum of friction and play whereby the rotational movement between the ball and its socket is supplemented.

In removing the gun from the mount the handle 42, which is mounted and secured on cam shaft 41 by pin 58, is rotated, generally less than 90° in either direction. This rotation causes like turning of the shaft 41 and the cam 39, to which it is centrally fixed, causing spreading of the dogs 35 by bearing against the cam faces 38 and pushing the dogs outwardly about their pivots 36 against the pressure of the springs 44. When the latches 32 have been spread sufficiently to positions where the lips 37 clear the detent or shoulder 28 the gun barrel may be withdrawn from the sleeve and the latches returned to their inward or closed positions under the action of the springs when the handle 42 is released and the bearing faces 38 cause the cam 39 to again assume the position in which it is shown in Fig. 5. It should be noted that the cam 39 is provided on the side of the gun adjacent the handle 42 only and that therefore the latch carrying dogs 35 on the same side of the gun are provided with cam surfaces 38 whereas the latch carrying elements 35a on the opposite side of the gun are not provided with cam surfaces and merely serve as a suspension link to support the opposite side of the latch 32 in its pivotal movement about the pin 36.

When the gun is removed from the mount the plug shown in Fig. 6 is inserted into the inner end of the sleeve 25 to seal the aircraft interior from the outside. Such sealing is desirable in high altitude flying, when weather conditions are bad, and for other reasons. It should be noted that the removal of the gun at such times serves to protect the gun from rain, dust, dirt and other adverse conditions. A frusto-conical portion 49 of the plug may be of cork, rubber or similar resilient material, and has attached thereto a deformed flat spring 50 suitably clamped to the body portion by the bolt 52 embracing the washers 51. It will be seen that as the plug is inserted within the sleeve the offset body portion 53 of the spring will spread as it rides along the surfaces 27 of the sleeve and will snap about the shoulder portion 28 in a similar fashion to the latch 32. The removal of the plug is facilitated by outward pulling at the handle portions 54 of the spring causing the offset portions to spread and be released from the shoulders 28.

Figure 3:
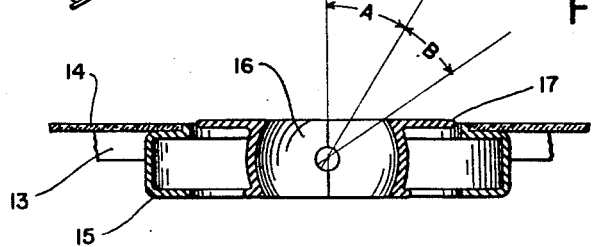
Fig. 3 is an enlarged cross-section of the socket and its frame indicating the normal and increased angles through which the axis of the gun barrel can be rotated.

Reference to Fig. 3 shows the magnitude of the increased firing angles through which the gun may be rotated due to the secondary movement provided by the pivot of the socket element. The angle A indicates the angle through which the gun is traversed as a result of maximum rotation of the ball within the socket only, i. e., with the socket 16 remaining in the flush position shown. The additional angle B indicates the increased amount which both the gun and the ball element are permitted to rotate as a result of the freedom of the socket assembly to pivotally rotate within the frame 15, resulting in the attitude shown in Fig. 2. It should be noted that the axis of the pivot 18 should extend transversely to the major axis of both the opening 12 and the aircraft body in which the mount is installed. In other words, where 10 would represent the upper surface of an aircraft fuselage the gun would lie in its vertical plane of symmetry and the longitudinal axis of the craft would extend substantially horizontally across Figs. 1 and 2.

The flexibly mounted gun 11 is provided with gun sights 56 and 57 which are both carried on the breech portion of the gun obviating the necessity of passing the forward sights through the mount. It will be noted that in substantially every firing attitude of the gun the line of sight passes through the transparent shield 14. Due to the elliptical shape of the inner frame 15 and the socket assembly 16 when the gun is fired at right angles to the surface of the body 10 the gun would normally be rotated within or with the ball and about the axis of its barrel approximately 90° in either direction to permit the gun sights to clear across the minor axis of the elliptical frame 15.

Although the preferred modification has been shown applied to an aircraft body, it is equally applicable of use with marine craft, land tanks or other craft or vehicles. Other beneficial results and advantageous modifications which may become obvious to those skilled in the art are intended to fall within the embrace of the present invention as more clearly defined in the appended claims.

What I claim is:

1. In a mount for a gun, a supporting frame having an opening, a member pivotally journalled within said frame for limited rotation within said opening and having a part-spherical socket portion, and a movable gun-carrying element having a part-spherical ball portion adapted for universal movement within said socket portion and separate pivotal movement with said member and with respect to said frame whereby the movement of said gun with respect to said frame is increased beyond the normal movement provided by the ball and socket portions.

2. In a mount for a machine gun, a supporting frame having a central opening, a member pivotally supported in journals carried by said frame for movement within said frame opening, said member having a part-spherical socket portion, and a movable-gun carrying element having a part-spherical ball portion adapted for universal movement within said socket portion, the said universal movement being augmented within the plane normal to said pivotal supporting axis of said frame by the relative movement between said member and said frame.

3. In a universal mount for a machine gun, an aircraft body having a longitudinal plane of symmetry, a supporting frame in substantially flush alignment with an exterior surface of said body having an opening of greater length than width, the minor axis of said opening lying in a plane normal to the said longitudinal plane of symmetry of said body, a socket member pivotally supported within journals carried by said frame for movement within said opening and with its pivotal axis extending in the direction of said minor axis, and a movable gun-carrying element having a part-spherical ball portion adapted for universal movement within said member, the said universal movement being augmented within a longitudinal plane by the relative movement between said socket member and said frame.

4. In a readily detachable mount for a gun, a mount, a gun, a tapered portion carried by said mount, a circumferential detent on said portion, spring-pressed latch means carried by said gun adapted to embrace said detent at a plurality of positions along its circumference and cam means disposed between said latches adapted to release said gun from said mount by disengagement of said latch means from said detent.

5. In a readily detachable mount for a gun, a mount, a gun, a tapered portion carried by said mount, said portion having a circular co-axial detent spring-pressed latch means carried by said gun adapted to embrace the detent of said male portion at any position within the plane normal to the axis of said portion, cam means engageable with said latch means adapted to release said gun from said mount and manually rotatable means journalled upon said gun for rotation of said cam means into its detaching position.

6. In a readily detachable mount for a gun, a mount, a gun, a ball portion of said mount having a tapered unitary sleeve extending beyond the surface of said ball portion adapted to receive the barrel of said gun, detent means carried by said sleeve, complementary attachment means carried by said gun engageable with said detent means adapted for quick attachment of said gun to said mount solely by axial movement in the direction of said taper and means carried by said gun operable for quick detachment of both said means.

7. In a gun installation, a body structure, a unitary gun-carrying member universally supported upon the body structure, said member comprising a part-spherical ball portion adapted for universal mounting and a radially extending tubular latch portion extending beyond said spherical surface adapted for the quick attachment of the gun thereto solely by axial movement of the barrel of said gun within said tubular latch portion.

8. In a gun installation, a relatively fixed frame, a part-spherical socket member pivotally mounted upon said frame, said pivotal mounting comprising dual alined trunnions whose axis passes through the center of said sphere, a unitary gun-carrying member comprising a part-spherical ball portion adapted for universal mounting within said socket member and a tubular latch portion carried by said member having its axis intersecting said trunnion axis at the center of said sphere adapted for the quick attachment of the gun barrel therewithin, whereby universal movements of said gun with respect to said frame are increased by the pivotal mounting of said socket member.

9. In a quick detachable gun installation, a flexibly mounted machine gun having breech and barrel portions, a universally mounted gun-carrying member having an axially extending sleeve portion centrally bored to closely receive said gun barrel, detent means formed on the exterior of said sleeve, spring-pressed means carried by the breech portion of said gun for automatic attachment to said detent means on insertion of said gun barrel through said sleeve bore.

10. In a quick detachable gun installation, a machine gun having breech and barrel portions, a universally mounted gun carrying member having an axially disposed sleeve portion centrally bored to closely receive said gun barrel, detent means formed on the exterior of said sleeve, spring-pressed means carried by the breech portion of said gun for automatic attachment to said detent means on insertion of said gun barrel through said sleeve bore and a single rotatable cam means journalled upon said gun breech and engageable with said spring-pressed means adapted for manual operation for release of said gun from said member.

11. In a mount for a machine gun, a relatively fixed frame having a central opening and mounting means disposed at the edges of said opening, a member having complementary mounting means engageable with the said frame mounting means adapted for relative movement within said frame opening and with respect to said frame, the said member having a part-spherical socket portion, a ball member disposed within said socket portion for universal movement therewithin, the said ball member having an internally bored sleeve portion having external detent means, and latch means disposed adjacent the barrel of said gun for releasable engagement with said detent means for attachment of said gun barrel to said universally mounted ball member.

12. In a mount for a gun, a relatively fixed frame having a central opening and axially alined bores open to said opening, a member having alined outwardly extending trunnions adapted for journalling within said bores for relative movement within said opening and with respect to said frame, the said member having a part-spherical socket portion, a ball member disposed within said socket portion for universal movement therewithin, the said ball member having an internally bored sleeve portion having external detent means and latching means disposed adjacent the barrel of said gun for releasable engagement with said detent means for attachment of said gun barrel to said universally mounted ball member.

13. In a mount for a machine gun, a relatively fixed frame having marginal portions defining a central opening and opposed axially alined bores within said marginal portions open to said opening, said frame provided with a transparent portion enclosing said opening, a member having alined outwardly extending trunnions adapted for journalling within said bores for relative movement within said opening and with respect to said frame, the said member having a part-spherical socket portion, a ball member disposed within said socket portion for universal movement therewithin, the said ball member having an internally bored sleeve portion, tapered detent means externally carried by said sleeve externally of the projected surface of said ball surface, latching means disposed adjacent the barrel of said gun for releasable engagement with said detent means solely by axial movement of said gun barrel into said sleeve bore along the axis of said tapered detent.

HENRY K. GROWALD.